Figure 1:
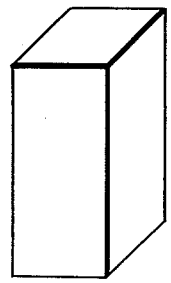

Aug. 3, 1965   A. M. ALPER ETAL   3,198,643
FUSED CAST REFRACTORY
Filed July 27, 1962

INVENTORS
ALLEN M. ALPER
AND FREDERICK G. KEIHN
BY
Clarence R. Patty, Jr.
ATTORNEY

3,198,643
FUSED CAST REFRACTORY
Allen M. Alper, Corning, and Frederick G. Keihn, New City, N.Y., assignors to Corhart Refractories Company, Inc., Louisville, Ky., a corporation of Delaware
Filed July 27, 1962, Ser. No. 212,912
4 Claims. (Cl. 106—59)

This invention relates to improvements in fused cast chrome-magnesia refractories and articles made thereof. In particular, the invention relates to improvements in fused cast refractories of the type disclosed in United States Patents 2,599,566 and 2,690,974 to R. J. Magri, Jr. and in the copending U.S. application Serial No. 127,475 filed July 28, 1961 by A. M. Alper and R. N. McNally, now U.S. Patent No. 3,132,954, assigned to the assignee of the present application. As is well known, fused cast refractory is the type of refractory which is produced by melting a mass of refractory material of the desired composition, casting and cooling the molten refractory material to form a solidified refractory mass.

The refractory materials of the above-mentioned patents and copending application possess marked improvement in resistance to heat shock or spalling in use together with good resistance to attack by ferruginous slags in comparison to earlier known fused cast basic refractories. These properties have made them especially adaptable for refractory linings in steel-making furnaces, for example, particularly in roofs of open hearth furnaces. However, among the continuing efforts to minimize the increase in costs of steel production, there has been the effort of refractory manufacturers to make refractory materials that are better able to withstand the detrimental effects of slags and stresses, both thermal and mechanical, for much longer periods of time. Thus, by increasing the service life of the refractory, a very substantial savings in refractory materials cost can be realized by the steel manufacturers.

Experience with the fused cast refractories of the above-mentioned patents and copending application, in commercial use as open hearth furnace roofs, has shown that one of the most significant factors in limiting the service life of the refractory is that of cracking and spalling. From numerous observations of brick used in open hearth roofs, it appears that, had it not been for the spalling, the service life would have been very considerably longer because of the good resistance to attack by ferruginous slags and slag vapors or other corrosive combustion products in the furnace atmosphere. Moreover, this cracking and spalling problem appears to be aggravated by the increased utilization of multiple oxygen lancing of the present day steel-making furnaces with concomitantly higher furnace temperatures.

It has now been discovered that the resistance to cracking and spalling in service for fused cast refractories of the type disclosed in the aforementioned patents and copending application can be very substantially improved by the addition of significant amounts of titanium oxide and without any noticeable decrease in resistance to slag attack. Thus, by a rather simple and inexpensive composition modification, there is obtained a fused cast refractory capable of longer service life.

Accordingly, it is an object of this invention to provide a fused cast chrome-magnesia refractory having a substantially improved resistance to cracking and spalling in service.

It is another object of this invention to provide a fused cast chrome-magnesia refractory having improved strength (viz. higher modulus of rupture) so that the cast refractory can withstand greater strains, mechanical or thermal, before failure and thereby affording an increased resistance to cracking and spalling.

It is a further object of this invention to provide a fused cast chrome-magnesia refractory having improved pyro-plasticity (viz. a small but significant increase in plasticity at temperatures of about 1400° C. or higher) so as to allow the release of a substantial amount of thermal gradient stresses developed in the cast refractory during service as a furnace lining and to allow the release, to a much lesser degree, of externally applied stresses as occur due to thermal expansion of the cast refractory bricks or due to mechanical loading. This ability of the cast refractory to release, or absorb, a substantial amount of the stresses developed in service effectively provides an increased resistance to cracking and spalling.

Additional objects and advantages of the present invention will become apparent, to those skilled in the art, from the following detailed description and the attached drawing.

In the drawing, FIGURES 1 through 5 illustrate a scheme of spalling defect classification for thermally cycled brick.

The improved fused cast refractory material of this invention broadly consists essentially of the following, analytically in percent by weight:

| | |
|---|---|
| $MgO$ | 40 to 79 |
| $Cr_2O_3$ | 4 to 58 |
| $Al_2O_3$ | up to 30 |
| $FeO$ | up to 18.5 |
| $MgO+Cr_2O_3+Al_2O_3+FeO$ | at least 82 |
| $Fe_2O_3$ | up to 5 |
| $SiO_2$ | up to 5 |
| $CaO$ | up to 10 |
| Fluorine | up to 7 |
| $Ti_2O_3$ | 0.35 to 10 | with the ratio of the mols of RO oxides to the sum of the mols of $R_2O_3$ oxides plus one-half the mols of $SiO_2$ being at least 2.4.

The above described balanced refractory composition provides the three primary factors found necessary for the attainment of the improved high degree of spalling resistance together with good resistance to slag attack in cast refractories of this invention: (1) a magnesia content of the cast refractory sufficiently large enough so that a separate periclase phase is present in significant amounts of at least about 20 to 25% by weight of the whole refractory, (2) a molal ratio of the RO oxides to the $R_2O_3$ oxides plus one-half the $SiO_2$ being substantially greater than unity, i.e. at least 2.4, and (3) a titanium oxide content mostly or wholly in solid solution in the chrome-containing spinel phase and in amounts effective to provide a significant improvement in spalling resistance over and above the spalling resistance provided by the first two factors, but not in excessive amounts that detrimentally affect other desirable and essentially properties of the cast refractory, e.g. resistance to slag attack and phase stability in service with its concomitant effect of negligible or very small permanent volume change of the casting. The first two factors are basically derived from the teachings of the aforementioned patents to R. J. Magri, Jr.; however, this invention and its improved benefits are based on the novel and essential combination of all three of the above named factors.

Particularly good improved fused cast refractories have been obtained in three preferred compositional areas as follows, with the constituents analytically in percent by weight:

|  | A | B | C |
|---|---|---|---|
| MgO | 45 to 78 | 45 to 76 | 40 to 73. |
| $Cr_2O_3$ | 4 to 15 | 12 to 29 | 26 to 53. |
| $Al_2O_3$ | 3 to 30 | 1.5 to 25 | Up to 20. |
| FeO | Up to 6.4 | Up to 14.5 | Up to 14.5. |
| $MgO+Cr_2O_3+Al_2O_3+FeO$ | At least 87 | At least 87 | At least 87. |
| $Fe_2O_3$ | Up to 2 | Up to 3 | Up to 3. |
| $SiO_2$ | Up to 3 | Up to 3 | Up to 3. |
| CaO | Up to 6 | Up to 6 | Up to 6. |
| Fluorine | Up to 3 | Up to 3 | Up to 3. |
| $Ti_2O_3$ | 0.4 to 5 | 0.4 to 4 | 0.4 to 9. |
| Molal ratio of: $\frac{RO}{R_2O_3+\frac{1}{2}SiO_2}$ | 3 to 15 | 3 to 10 | 3 to 10. |

Fused cast refractories with compositions within the above preferred areas will generally have a separate periclase phase amounting to at least about 30% by weight of the whole refractory.

As will be appreciated, relatively high temperatures are required to fuse and melt the compositions of this invention. Preferably, conventional electric arc melting furnaces are employed, although any other suitable means can be used as desired. Suitable raw batch materials are proportioned in accordance with the desired final composition and are preferably premixed prior to charging into the melting furnace. The batch material is then processed according to the well-known fusion casting techniques, for example, as disclosed in United States Patent 1,615,750 to G. S. Fulcher, to which reference may be made.

Among the variety of suitable raw materials that can be used in the production of refractory of this invention are: (a) commercial calcined magnesites; (b) refractory grade chromite ores, such as those from South Africa, Turkey or Iran; (c) commercial chrome green oxide paint pigment when it is desired to avoid or minimize the iron oxide content associated with the use of chromite ores; (d) commercial alumina, such as a Bayer process alumina, when the other raw materials do not contain a sufficient amount to provide the desired content; (e) rutile (generally 92 to 98% $TiO_2$), ilmenite (basically $FeTiO_3$) or sphene (basically $CaTiSiO_5$); and (f) metal fluorides, such as fluorspar, cryolite or aluminum fluoride. Of course, the foregoing list of raw materials is given merely by way of illustration and not of limitation. Other suitable raw materials will become apparent to those skilled in the art.

While refractories according to this invention can be made with little or no FeO content by use of pure raw materials for the other constituents, viz. chrome green oxide instead of chromite ore, this increases the cost of the cast products. Similar results can be attained with less expensive raw materials, such as chromite ore, by eliminating the undesired FeO content during fusion and melting. This can be accomplished, for example by the known technique of effecting reduction of FeO to metallic iron through the use of metallic aluminum and thereafter allowing the metallic iron to settle to the bottom of the melting chamber.

The optional constituents of $SiO_2$, CaO and $Fe_2O_3$ are customarily derived from the raw materials providing the essential constituents and are generally considered tolerable impurities up the limits stated above; however, some benefits are obtained by their presence in these relatively small permissible amounts. The $SiO_2$, for example, in quantities of 0.5% or greater insures optimum resistance to hydration of the periclase phase. Also, CaO in amounts of at least 0.5% contributes to the attainment of optimum strength in the castings. Excessive amounts of $SiO_2$ and CaO tend to cause serious cracking of the castings during their manufacture, detrimentally reduce the resistance to slag attack and cause phase instability leading to undesirable permanent volume changes in service. Although $Fe_2O_3$ can be tolerated in limited amounts without any observable beneficial or seriously detrimental effect, excessive $Fe_2O_3$ contents seriously reduce the resistance to heat shock and spalling in service, and also cause detrimental phase instability in service.

As previously stated, the present invention constitutes an improvement in refractory of the type disclosed in the aforementioned copending application. Thus similarly to the teachings of that application, relatively small amounts of fluorine can optionally be incorporated in the refractory of the present invention to overcome or minimize any tendency of the castings to crack during cooling in the mold. This cracking tendency has been found particularly evident in large castings, e.g. in billets weighing 300 to 1200 pounds or more. In these situations, fluorine should be incorporated into the molten refractory (for example, by means of a metal fluoride batch addition) in an amount of at least 0.03% by weight and preferably at least 0.07% by weight. In addition to overcoming the cracking tendency, the fluorine content contributes to the attainment of optimum resistance to slag erosion of the cast material.

Examples of particular commercially available raw materials used and found suitable for the present invention are shown below in terms of typical chemical analyses in weight percent:

Transvaal chrome ore:

|  | Percent |
|---|---|
| $Cr_2O_3$ | 44 |
| FeO | 23 |
| $Al_2O_3$ | 13 |
| MgO | 12 |
| $SiO_2$ | 4 |
| CaO | 0.5 |
| $TiO_2$ | 0.4 |

Calcined magnesite:

| MgO | 98.0 |
|---|---|
| CaO | 1.0 |
| $SiO_2$ | 0.4 |
| $Fe_2O_3$ | 0.2 |
| $Al_2O_3$ | 0.2 |
| Ignition loss | 0.5 |

Rutile:

| $TiO_2$ | 96–98 |
|---|---|
| $Fe_2O_3$ max | 1 |
| $ZrO_2$ | 0.3 |
| $Al_2O_3$ | 0.3 |
| $SiO_2$ | 0.25 |
| $Cr_2O_3$ | 0.1 |
| $V_2O_5$ | 0.29 |
| $P_2O_5$ | 0.025–0.05 |
| S | 0.01 |

Alumina:

| $Al_2O_3$ | 99.2 |
|---|---|
| $SiO_2$ | 0.02 |
| $Fe_2O_3$ | 0.03 |
| $Na_2O$ | 0.45 |
| Ignition loss | 0.4 |

Fluorspar:

| $CaF_2$ | 97.3 |
|---|---|
| $CaCO_3$ | 1.2 |
| $SiO_2$ | 1.1 |
| $Fe_2O_3$ | 0.1 |
| Ignition loss | 0.3 |

In the production of refractory of this invention with the foregoing raw materials and utilizing electric arc melting with graphite electrodes, as is conventional practice, there is some reduction of the FeO and the $Cr_2O_3$ as well as volatilization of some or most all of the constituents.

However, compositional control is not too difficult because by experience it has been found that the losses generally balance in such a way that the percentages of all the constituents, except fluorine, in the fused cast product are substantially those of the batch. It is believed that most or all of the titanium oxide introduced in the batch as $TiO_2$ is reduced to $Ti_2O_3$ (possibly some may be in the form of transition oxides between $TiO_2$ and TiO) as a result of the relatively high melting temperatures causing loss of oxygen from $TiO_2$ and/or the use of graphite electrodes in arc-melting. Throughout this specification and in the appended claims, all titanium in the refractory of this invention is considered and calculated as $Ti_2O_3$ for the purposes of defining the invention, even though some of the titanium may actually occur in an oxidation state other than $Ti_2O_3$.

When fluorine is incorporated by the use of metal fluoride batch material, there is some loss by volatilization depending upon the boiling point of the fluoride used. Generally, only metal fluoride having a boiling point of at least 1200° C. should be used to avoid uneconomical retention of fluorine in the product. Experience with the above stated fluorspar, having a boiling point of approximately 2500° C., has demonstrated a fairly consistent retention of 65–80% of the fluorine in the batch. Thus, an extra amount of fluorspar is added to the batch to compensate for the anticipated loss.

It will be appreciated that the necessary adjustments in batch composition to attain the desired product composition will vary depending upon the raw materials and melting temperatures used. These adjustments can be readily ascertained by those skilled in the fused cast refractory art according to conventional sampling practices.

After the batch materials have been thoroughly melted, the molten mass is cast into conventional preformed molds of any suitable material, e.g. graphite or sand, and allowed to cool and solidify according to the more conventional practice, or when desired, the refractory material can be melted and solidified in the same container. In some cases where it is desired to make use of the refractory material in the form of relatively small granular pieces (as for subsequent use in bonded refractories), the molten mass can be disintegrated by conventional techniques into globules of desired size and then solidified as a mass of fused cast granular material.

Upon solidification, the refractory material of this invention forms two primary crystalline phases: the periclase phase and the spinel phase. In the more usual cases where the refractory contains $SiO_2$ and CaO, a minor crystalline silicate phase is also formed. Additionally, when fluorine is included in the refractory composition, there may occur a very minor amount of randomly dispersed islands of what appears to be a crystalline fluoride phase, of which the composition is not definitely known.

The periclase phase, which comprises at least 20–25% and preferably at least 30% by weight of the whole refractory, is the most refractory phase in that it has the highest melting point. In the absence of FeO in the refractory, the phase is composed essentially of all MgO. With increasing amounts of FeO in the refractory, this phase contains increasing amounts of FeO in solid solution with the MgO and it may actually form magnesiowustite (MgO·FeO) with the higher FeO contents.

The major part of the spinel phase forms in a somewhat discontinuous fashion around the periclase grains. The spinel phase is basically a form of pichrochromite spinel (MgO·$Cr_2O_3$). However, essentially all the titanium oxide in the cast products is found to be in the spinel phase. As previously stated, it is believed that substantially all of the $TiO_2$ in the batch has been reduced to $Ti_2O_3$ and modifies the pichrochromite spinel to form the complex spinel MgO·$(Cr,Ti)_2O_3$. In the more usual cases where the refractory also contains $Al_2O_3$, FeO and possibly some $Fe_2O_3$, the spinel phase becomes more complex and can be generally represented as $$(Mg,Fe)O \cdot (Cr,Ti,Al,Fe)_2O_3$$

When $SiO_2$ is present in the refractory, the silicate phase formed by it fills up the last solidifying areas, which are generally within or between spinel grains. If fluorine is included, any islands of fluoride phase that occur will appear within or adjacent the silicate phase; thus it may be that the fluoride phase is last to solidify in these cases. The silicate phase is basically a form of forsterite $$(2MgO \cdot SiO_2)$$

particularly in the absence of FeO and CaO. With increasing amounts of FeO in the refractory, increasing amounts of MgO in this phase are replaced by FeO and this phase becomes a form of olivine $(2(Mg,Fe)O \cdot SiO_2)$. Most of any CaO in the refractory will also appear in the silicate phase by replacing MgO, thereby forming a complex silicate that can be generally represented as $2(Mg,Fe,Ca)O \cdot SiO_2$.

During further cooling after complete solidification, tiny blebs of spinel phase are found to precipitate out of the periclase grains. These blebs form within the periclase grains and also form additional spinel coating around the periclase grains. Thus, it is apparent that, upon initial crystallization of the periclase, there was some $R_2O_3$ oxides contained in solid solution. It appears that the precipitated spinel phase generally is of the same composition as the major part of the initially crystallized spinel phase.

One of the more important characteristics contributed by the substantial amount of periclase to the cast refractory material of this invention is a higher thermal conductivity. As a result of this, the cast refractory will avoid developing, or develop to a lesser degree, severe thermal gradients within the refractory mass when subjected to alternate heating and cooling. Thus, better heat distribution throughout the cast material provides less severe thermal stresses and therefore better resistance to cracking and spalling.

In view of the fact that the silicate phase is the least refractory and the most easily attacked by slags and slag vapors, it is important to minimize it. The present invention is predicated upon forming no more than about 6%, and preferably less than 3.5%, silicate by weight of the whole refractory. Within these limits, properties such as resistance to hot load deformation and to slag attack are not seriously affected.

The titanium oxide content in the refractory of this invention provides two particularly beneficial effects that contribute to the improved spalling resistance. The first is that the periclase grains are more extensively coated or surrounded by the spinel phase, in comparison with the refractories of the aforementioned patents and copending application. It is believed that this provides better and stronger bonding between the periclase grains and contributes significantly to the higher strength attained in the refractories of this invention. The other beneficial effect is that the titanium oxide content in the spinel phase renders it somewhat more pyroplastic at elevated temperatures, e.g. about 1400° C. or higher. This allows the stresses developed in service to be released or reduced via some plastic deformation instead of resulting in brittle fracture which has been found to occur when titanium oxide is not present or is present only in very low percentages as a residual impurity from a raw material such as chromite ore. This increased pyroplasticity can be characterized as a slow creep type deformation at these elevated temperatures, but it does not substantially reduce the resistance to hot load deformation to any undesirable degree.

The melt (casting) analyses given in Table I are illustrative of the compositions of the improved refractory of this invention:

Table I [a]

| Melt No. | 1 | 2 | 3 | 4 | 5 | 6 | 7 | 8 |
|---|---|---|---|---|---|---|---|---|
| MgO [b] | 57.95 | 57.05 | 46.15 | 75.6 | 61.3 | 59.5 | 77.1 | 40.0 |
| $Cr_2O_3$ | 21.0 | 21.0 | 16.3 | 4.4 | 8.5 | 8.0 | 6.6 | 26.0 |
| $Al_2O_3$ | 7.0 | 7.0 | 23.0 | 12.0 | 22.0 | 22.0 | 3.0 | 10.0 |
| FeO | 10.4 | 10.4 | 8.0 | 2.5 | 6.3 | 4.0 | 3.3 | 12.9 |
| $SiO_2$ | 2.0 | 2.0 | 1.6 | 0.5 | 0.5 | 0.5 | 0.5 | 1.5 |
| CaO | 1.0 | 1.0 | 2.3 | 0.5 | 0.5 | 1.0 | 0.5 | 0.6 |
| Fluorine | 0.2 | 0.2 | 1.3 | | | 0.5 | | |
| $Ti_2O_3$ | 0.45 | 1.35 | 1.35 | 4.5 | 0.9 | 4.5 | 9.0 | 9.0 |
| Molal Ratio [c] | 7.05 | 6.78 | 3.65 | 10.55 | 5.74 | 5.10 | 14.26 | 3.44 |
| Periclase | 59 | 58 | 42 | 66 | 54 | 45 | 66 | 31 |
| Spinel | 38 | 39 | 56 | 33 | 45 | 54 | 33 | 67 |
| Silicate | 3 | 3 | 2 | 1 | 1 | 1 | 1 | 2 |

[a] Values in percent by weight, except for molal ratio values.
[b] By difference.
[c] $\dfrac{MgO + FeO + CaO}{Cr_2O_3 + Al_2O_3 + Ti_2O_3 + \tfrac{1}{2}SiO_2}$ The melt (casting) analyses given in Table II are illustrative of compositions of refractory according to the aforementioned patents and copending application and which were made for property comparisons with the foregoing example compositions of the present invention:

Table II [a]

| Melt No. | 9 | 10 | 11 | 12 | 13 | 14 | 15 |
|---|---|---|---|---|---|---|---|
| MgO [b] | 58.23 | 46.51 | 72.75 | 59.44 | 58.33 | 74.1 | 46.0 |
| $Cr_2O_3$ | 21.0 | 17.3 | 6.6 | 8.5 | 9.7 | 13.0 | 26.7 |
| $Al_2O_3$ | 7.0 | 24.0 | 15.0 | 25.5 | 25.0 | 4.8 | 11.5 |
| FeO | 10.4 | 9.0 | 4.0 | 5.5 | 5.5 | 6.5 | 13.4 |
| $SiO_2$ | 2.0 | 1.6 | 0.6 | 0.5 | 0.7 | 0.7 | 1.5 |
| CaO | 1.0 | 1.1 | 1.0 | 0.5 | 0.7 | 0.8 | 0.7 |
| Fluorine | 0.2 | 0.35 | | | | | |
| $Ti_2O_3$ | 0.17 | 0.14 | 0.05 | 0.06 | 0.07 | 0.1 | 0.2 |
| Molal Ratio [c] | 7.15 | 3.57 | 9.64 | 5.03 | 4.88 | 13.88 | 4.42 |
| Periclase | 59 | 43 | | | | | |
| Spinel | 38 | 55 | | | | | |
| Silicate | 3 | 2 | | | | | |

Figure 2:
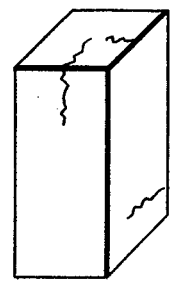
Figure 3:
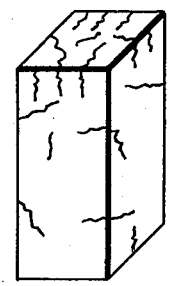
Figure 4:
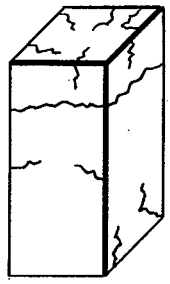
Figure 5:

[a] Values in percent by weight, except for molal ratio values.
[b] By difference.
[c] $\dfrac{MgO + FeO + CaO}{Cr_2O_3 + Al_2O_3 + Ti_2O_3 + \tfrac{1}{2}SiO_2}$ The improved resistance to spalling of refractory of the present invention can be seen by a comparison of the data shown in Table III. It will be noted from Tables I and II that, except for the titanium oxide content, Melt Nos. 1, 2 and 9 have substantially comparable compositions and likewise Melt Nos. 3 and 10. The spalling resistance classification is based on an accelerated test simulating the characteristic thermal gradient and cyclic thermal changes that occur in steelmaking furnace refractories. The test consists of heating a panel of several refractory sample bricks of each composition to 1250° C., then subjecting the bricks to a programmed thermal cycle consisting of: 2 hours hold at 1250° C., 2 hours heating up to 1650° C., 2 hours hold at 1650° C., 2 hours cooling to 1250° C., and repeating this cycle an additional 59 times for a total of 60 cycles. At the end of 60 cycles, the bricks are cooled to room temperature and classified in accordance with the following scheme:

| Defect Class | Type of Defect | Typical Appearance |
|---|---|---|
| 1 | No cracks | Figure 1. |
| 2 | Minor hot face and body cracks | Figure 2. |
| 3 | Extensive hot face and body cracks | Figure 3. |
| 4 | Tight spall crack | Figure 4. |
| 5 | Loose spall | Figure 5. |

The classification values in Table III are the average of the several bricks of each composition tested.

Table III

| Melt No. | 2 | 1 | 9 | 3 | 10 |
|---|---|---|---|---|---|
| $Ti_2O_3$ (wt. percent) | 1.35 | 0.45 | 0.17 | 1.35 | 0.14 |
| Spall classification [a] | 2 | 3.5 | 5 | 1.1 | 3.1 |

[a] Sample brick size for Melt Nos. 1, 2 and 9 were 6″ x 4½″ x 3½″; sample brick size for Melt Nos. 3 and 0 were 3″ x 4½″ x 13½″.

The improved strength of refractory of the present invention can be seen by a comparison of the standard modulus of rupture data shown in Table IV:

Table IV

| Melt No. | 4 | 11 | 5 | 12 | 6 | 13 | 7 | 14 | 8 | 15 |
|---|---|---|---|---|---|---|---|---|---|---|
| $Ti_2O_3$ (wt. percent) | 4.5 | 0.05 | 0.9 | 0.06 | 4.5 | 0.07 | 9.0 | 0.1 | 9.0 | 0.2 |
| Modulus of Rupture (p.s.i. x $10^2$) | 66 | 24 | 30 | 13 | 25 | 13 | 96 | 21 | 60 | 19 |

In this specification and in the appended claims, "RO oxides" is defined as being the sum of the analytic refractory oxide constituents in which the metallic cations are combined with anionic oxygen in an atomic ratio of 1:1 and "$R_2O_3$ oxides" is defined as being the sum of the analytic refractory oxide constituents in which the metallic cations are combined with anionic oxygen in an atomic ratio of 2:3.

Although the present invention has been described with reference to specific details of certain embodiments thereof, it is not intended that such details be limitations upon the scope of the invention except insofar as set forth in the following claims.

What is claimed is:

1. A fused cast refractory material consisting essentially of, analytically by weight, 40% to 79% MgO, 4% to 58% $Cr_2O_3$, up to 30% $Al_2O_3$, up to 18.5% FeO, the sum of MgO plus $Cr_2O_3$ plus $Al_2O_3$ plus FeO being at least 82%, up to 5% $Se_2O_3$, up to 5% $SiO_2$, up to 10% CaO, up to 7% fluorine and 0.35% to 10% $Ti_2O_3$, with the ratio of the mols of RO oxides to the sum of the mols of $R_2O_3$ oxides plus one-half the mols of $SiO_2$ being at least 2.4.

2. A fused cast refractory material consisting essentially of, analytically by weight, 45% to 78% MgO, 4% to 15% $Cr_2O_3$, 3% to 30% $Al_2O_3$, up to 6.4% FeO, the sum of MgO plus $Cr_2O_3$ plus $Al_2O_3$ plus FeO being at least 87%, up to 2% $Fe_2O_3$, up to 3% $SiO_2$, up to 6% CaO, up to 3% fluorine and 0.4% to 5% $Ti_2O_3$, with the the ratio of the mols of RO oxides to the sum of the mols of $R_2O_3$ oxides plus one-half the mols of $SiO_2$ being at 3 and 15.

3. A fused cast refractory material consisting essentially of, analytically by weight, 45% to 76% MgO, 12% to 29% $Cr_2O_3$, 1.5% to 25% $Al_2O_3$, up to 14.5% FeO, the sum of MgO plus $Cr_2O_3$ plus $Al_2O_3$ plus FeO being at least 87%, up to 3% $Fe_2O_3$, up to 3% $SiO_2$, up to 6% CaO, up to 3% fluorine and 0.4 to 4% $Ti_2O_3$, with the ratio of the mols of RO oxides to the sum of the mols of $R_2O_3$ oxides plus one-half the mols of $SiO_2$ being between 3 and 10.

4. A fused cast refractory material consisting essentially of, analytically by weight, 40% to 73% MgO, 26% to 53% $Cr_2O_3$, up to 20% $Al_2O_3$, up to 14.5% FeO, the sum of MgO plus $Cr_2O_3$ plus $Al_2O_3$ plus FeO being at least 87%, up to 3% $Fe_2O_3$ up to 3% $SiO_2$, up to 6% CaO, up to 3% fluorine and 0.4% to 9% $Ti_2O_3$, with the ratio of the mols of RO oxides to the sum of the mols of $R_2O_3$ oxides plus one-half the mols of $SiO_2$ being between 3 and 10.

References Cited by the Examiner

UNITED STATES PATENTS 2,048,263 7/36 Haglund _____ 106—62
2,599,566 6/52 Magri _____ 106—59
2,690,974 10/54 Magri _____ 106—59

TOBIAS E. LEVOW, *Primary Examiner.*

UNITED STATES PATENT OFFICE
CERTIFICATE OF CORRECTION

Patent No. 3,198,643                        August 3, 1965

Allen M. Alper et al.

It is hereby certified that error appears in the above numbered patent requiring correction and that the said Letters Patent should read as corrected below.

Column 8, Table III, in the footnote, for "3 and 0" read -- 3 and 10 --; line 38, for "$Se_2O_3$" read -- $Fe_2O_3$ --; same column 8, line 49, for "at" read -- between --.

Signed and sealed this 19th day of April 1966.

(SEAL)
Attest:

ERNEST W. SWIDER
Attesting Officer

EDWARD J. BRENNER
Commissioner of Patents